(12) United States Patent
Zhang et al.

(10) Patent No.: US 12,122,675 B2
(45) Date of Patent: Oct. 22, 2024

(54) METHOD FOR EFFICIENTLY DISPERSING CARBON NANOTUBE

(71) Applicant: SOUTH CHINA UNIVERSITY OF TECHNOLOGY, Guangdong (CN)

(72) Inventors: Xinya Zhang, Guangdong (CN); Haowei Huang, Guangdong (CN); Zhiqing Du, Guangdong (CN); Xiaojing Yu, Guangdong (CN); Wenyuan Li, Guangdong (CN); Xiaofeng Huang, Guangdong (CN)

(73) Assignee: SOUTH CHINA UNIVERSITY OF TECHNOLOGY, Guangzhou (CN)

( * ) Notice: Subject to any disclaimer, the term of this patent is extended or adjusted under 35 U.S.C. 154(b) by 955 days.

(21) Appl. No.: 17/046,419

(22) PCT Filed: Oct. 25, 2018

(86) PCT No.: PCT/CN2018/111934
§ 371 (c)(1),
(2) Date: Oct. 9, 2020

(87) PCT Pub. No.: WO2019/196386
PCT Pub. Date: Oct. 17, 2019

(65) Prior Publication Data
US 2021/0163294 A1    Jun. 3, 2021

(30) Foreign Application Priority Data
Apr. 12, 2018    (CN) .......................... 201810324628.5

(51) Int. Cl.
*C01B 32/174* (2017.01)
*C01B 32/159* (2017.01)
(Continued)

(52) U.S. Cl.
CPC .......... *C01B 32/174* (2017.08); *C01B 32/159* (2017.08); *C08K 3/041* (2017.05);
(Continued)

(58) Field of Classification Search
CPC .................................................... C01B 32/174
See application file for complete search history.

(56) References Cited

U.S. PATENT DOCUMENTS

2006/0159612 A1    6/2006  Ziegler et al.
2007/0057233 A1*   3/2007  Yoon ..................... B82Y 30/00
                                                 257/E51.02

(Continued)

FOREIGN PATENT DOCUMENTS

CN    101139089 B    3/2008
CN    104085879 A    10/2014
(Continued)

OTHER PUBLICATIONS

WIPO, State Intellectual Property of the P.R., China International Search Authority, International Search Report (with translation) and Written Opinion mailed Jan. 24, 2019 in International Patent Application No. PCT/CN2018/111934, 12 pages.

*Primary Examiner* — Peter F Godenschwager
(74) *Attorney, Agent, or Firm* — MASUVALLEY & PARTNERS; Peter Martinez

(57) ABSTRACT

The present invention discloses a method for efficiently dispersing carbon nanotubes. The method comprises mixing, in parts by mass, 1-30 parts of carbon nanotubes, 0.2-10 parts of functionalized carbon nanotubes and 400-1200 parts of a solvent, adjusting the pH of the resulting mixture to 5-9, and then ultrasonically dispersing the mixture to obtain a stably dispersed carbon nanotube dispersion; the functionalized carbon nanotube is one or more of a carboxylated carbon nanotube, a hydroxylated carbon nanotube, an ami- (Continued)

nated carbon nanotube, an acyl-chlorinated carbon nanotube, and a sulfonated carbon nanotube.

7 Claims, 2 Drawing Sheets

(51) Int. Cl.
  C08K 3/04       (2006.01)
  C08K 9/04       (2006.01)
  C09D 5/00       (2006.01)
  C09D 7/40       (2018.01)
  C09K 5/14       (2006.01)
  H01B 1/04       (2006.01)
(52) U.S. Cl.
  CPC .................. *C08K 9/04* (2013.01); *C09D 5/00* (2013.01); *C09D 7/70* (2018.01); *C09K 5/14* (2013.01); *C01B 2202/02* (2013.01); *C01B 2202/04* (2013.01); *C01B 2202/06* (2013.01); *C01B 2202/22* (2013.01); *C01B 2202/24* (2013.01); *C01B 2202/34* (2013.01); *C01B 2202/36* (2013.01); *C01P 2002/54* (2013.01); *C08K 2201/001* (2013.01); *C08K 2201/003* (2013.01); *C08K 2201/004* (2013.01); *C08K 2201/011* (2013.01); *H01B 1/04* (2013.01)

(56) References Cited

U.S. PATENT DOCUMENTS

| | | | |
|---|---|---|---|
| 2007/0292622 | A1 | 12/2007 | Rowley et al. |
| 2008/0260616 | A1 | 10/2008 | Tour et al. |
| 2010/0330358 | A1* | 12/2010 | Hashimoto ........... C01B 32/174 428/323 |

FOREIGN PATENT DOCUMENTS

| | | |
|---|---|---|
| CN | 104485225 B | 4/2015 |
| CN | 106117400 A | 11/2016 |
| CN | 106495131 A | 3/2017 |
| CN | 106957540 A | 7/2017 |
| CN | 107033266 B | 8/2017 |
| CN | 108584918 A | 9/2018 |
| CN | 109647001 A | 4/2019 |

* cited by examiner

METHOD FOR EFFICIENTLY DISPERSING CARBON NANOTUBE

RELATED APPLICATIONS

This application is the U.S. National Phase of and claims priority to International Patent Application No. PCT/CN2018/111934, International Filing Date Oct. 25, 2018, entitled Method For Efficiently Dispersing Carbon Nanotube; which claims benefit of Chinese Patent Application No. 201810324628.5 filed Apr. 12, 2018; both of which are incorporated herein by reference in their entireties.

FIELD OF THE INVENTION

The present invention relates to a method for preparing a carbon nanotube dispersion liquid, in particular to a method for dispersing carbon nanotubes by a Pickering emulsion.

BACKGROUND OF THE INVENTION

The axial dimension of carbon nanotubes is generally in the order of micrometers, while the radial dimension of carbon nanotubes can reach nanometers. Due to their large length-diameter ratio, carbon nanotubes can be made into carbon fibers with excellent toughness and anisotropic thermally conductive materials. Because of their unique hollow structure, carbon nanotubes are ideal catalyst carrier materials and hydrogen storage materials. Therefore, carbon nanotube reinforced composites have become an important field in materials research.

However, due to the strong van der Waals force between carbon nanotubes, they are easy to get entangled or agglomerated into bundles, which restricts the application of carbon nanotubes. In order to make carbon nanotubes better dispersed, some physical and chemical methods are often used for processing. The commonly used physical methods include high-energy ball milling, mechanical agitation, ultrasonic vibration and so on. Chinese invention patent application CN201610044412.4 discloses a method of wet ball milling by mixing cage-like silsesquioxane derivatives with multi-walled carbon nanotubes. However, this method is time-consuming and comprises complicated steps; besides, the high-energy mechanical action will cause the carbon nanotubes to crack, greatly reducing the length-diameter ratio of the carbon nanotubes, weakening the advantages of the carbon nanotubes in mechanical strength and Young's modulus; moreover, the dispersion obtained by the physical method has poor stability and can only last for a short time. A chemical dispersion method mainly includes activation of strong acids and strong alkalis, addition of surfactants, and covalent grafting of small molecule groups on the surface of the carbon nanotubes. Chinese invention patent application CN201410338909.8 discloses a method for preparing a high-concentration carbon nano dispersion liquid by placing carbon nanotubes in a strong oxidizing solution to obtain carboxylated carbon nanotubes and then aminating the obtained carboxylated carbon nanotubes. However, this method uses strong acids, strong oxidants, and toxic and harmful amine compounds, which will cause secondary pollution emissions during the separation and purification process; in particular, excessive strong oxidation treatment of carbon nanotubes will lead to too many surfacial defects of carbon nanotubes, and thus make the excellent electrical conductivity reduced or even lost.

Chinese invention patent application CN201710457271.3 discloses a method for dispersing carbon nanotubes/nitrogen-doped carbon nanotube-graphite nanosheets with small molecular surfactants such as polyvinylpyrrolidone, sodium dodecyl sulfonate, methylcellulose and Tween-80, and siloxane. Because the carbon nanotubes have not been modified with their surface morphology not destroyed, the prepared conductive paste has good electrical conductivity. However, the amount of the small molecular surfactants used is large, and the surfactants are often biotoxic and potentially cause environmental pollution, which is not conducive to the application in the field of biomedicine.

A Pickering emulsion refers to a emulsion that is stabilized by solid particles instead of traditional surfactants. Compared with traditional emulsions formed with surfactants, the Pickering emulsion has the advantages of less dosage, less toxicity to human body, and no pollution to the environment. Therefore, the Pickering emulsion has great potential value in chemical industry, cosmetics, biomedicine and other fields. Nanoparticles that can be used to stabilize the Pickering emulsion include nano-sized ferric oxide, graphene oxide, halloysite nanotubes, nanosilica, nanosilver, cellulose, lignin, and so on. Chinese invention patent application CN201710439614 discloses a method for preparing a highly dispersed carbon nanotube/polystyrene nanocomposite. The method performs diazotization modification on the surface of carbon nanotubes to make them amphiphilic, and then uses the obtained functionalized carbon nanotubes as solid particle stabilizers in the preparation and polymerization of the Pickering emulsion of styrene. This method can obtain a uniform dispersion of carbon nanotubes/polystyrene, but the diazotization reaction process of carbon nanotubes is dangerous, and the electrical conductivity of diazotized carbon nanotubes is reduced.

Chinese invention patent application CN201410647405.4 discloses a method for dispersing acidified carbon nanotubes by using magnetic nano-sized ferric oxide as a solid dispersant; however, due to the oxidation treatment of the carbon nanotubes in this method, the carbon nanotubes are broken, resulting in a reduction in the length-diameter ratio and mechanical strength of the carbon nanotubes. Chinese invention patent application CN201610570920.6 discloses a method for assembling hydrophilic graphene oxide and carbon nanotubes into an amphipathic controllable Pickering system. However, graphene oxide is an insulator due to its extremely high degree of oxidation; besides, because of the large specific surface area and high shielding performance, graphene oxide adsorbs a lot of carbon nanotubes on its surface, which reduces the density of the conductive cross-linking network of the carbon nanotubes and hinders the contact of the carbon nanotubes with other substances, therefore unfavorable to the dispersion of the carbon nanotubes in the polymer molding process.

Therefore, development of a simple and easy process method that can disperse carbon nanotubes in various solvents with no need for surfactants but without reducing the electrical and thermal conductivity and the mechanical properties of the carbon nanotubes, is very important for promoting the practical industrial application of carbon nanotubes in organic-inorganic nanocomposites such as thermally conductive coatings, electrically conductive polymers, and super capacitors.

Contents of the Invention

In order to mainly solve the problems that carbon nanotubes are easy to agglomerate, have low dispersion concentration and poor stability, and have poor electrical and thermal conductivity and mechanical properties in the existing carbon nanotube dispersion liquid, the present invention provides a method capable of efficiently dispersing carbon nanotubes, which neither requires surfactants nor reduces the electrical and thermal conductivity and the mechanical properties of carbon nanotubes.

The object of the present invention is achieved by the following technical solution:

A method for efficiently dispersing carbon nanotubes is provided; the method comprises mixing, in parts by mass, 1-30 parts of carbon nanotubes, 0.2-10 parts of functionalized carbon nanotubes and 400-1200 parts of a solvent in the grinding stage, adjusting the pH of the resulting mixture to 5-9, and then ultrasonically dispersing the mixture to obtain a stably dispersed carbon nanotube dispersion; the functionalized carbon nanotube is one or more of a carboxylated carbon nanotube, a hydroxylated carbon nanotube, an aminated carbon nanotube, an acyl-chlorinated carbon nanotube, and a sulfonated carbon nanotube.

In order to further achieve the object of the present invention, preferably, the carbon nanotube is one of a single-walled carbon nanotube, a double-walled carbon nanotube, a multi-walled carbon nanotube, a nitrogen-doped carbon nanotube, and a fluorine-doped carbon nanotube.

Preferably, the carbon nanotube is 0.5-2 μm in length and 30-50 nm in diameter.

Preferably, the amount of the functionalized carbon nanotube is 0.01% to 5% by mass of the carbon nanotube.

Preferably, the solvent is one of water, acetone, ethanol, butyl acetate, toluene, N-methyl-2-pyrrolidone, N,N-dimethylformamide, and dimethyl sulfoxide.

Preferably, the reagent for adjusting pH is one of sulfuric acid, phosphoric acid, nitric acid, acetic acid, phosphoric acid, ammonia water, sodium hydroxide, sodium hydroxide, and sodium bicarbonate.

Preferably, the ultrasonic power is 70-120 W.

Preferably, the ultrasonic dispersion time is 0.15-3 h.

The functionalized carbon nanotubes of the present invention refer to the carbon nanotubes with side wall functionalization or end group functionalization.

The mechanism of the present invention is as follows: After carbon nanotubes are functionalized, many small molecular hydrophilic functional groups, such as hydroxyl, carboxyl, sulfonic acid group, epoxy, carbonyl, aldehyde, amide, and amine, will be generated on the surface or end groups of the carbon nanotubes; these groups have $sp^3$ hybrid carbon atoms and oxygen atoms, so they are very hydrophilic and can be miscible with a variety of solvents to form a stable colloidal solution; the unoxidized or functionalized regions still maintain the hydrophobic $sp^2$ hybrid carbon atom structure, so they can be assembled with the original, untreated carbon nanotubes through a non-covalent π-π interaction to form a carbon nanohybrid structure; the introduction of hydrophobic carbon nanotubes reduces the proportion of polar groups in the carbon nanohybrid structure, so the carbon nanohybrid structure has controllable amphiphilicity and a certain three-dimensional spatial structure. The self-assembly behavior of this three-dimensional structure is of entropy production and a pure adsorption behavior model without chemical reaction. The three-dimensional structure of the carbon nanotubes has structural stability and dispersion stability; while retaining the low-dimensional structure and high specific surface area of the carbon nanotubes, the carbon nanotubes overcome the anisotropy of the one-dimensional carbon nanotubes in terms of structure and function, and fundamentally solve the problem of the aggregation and stacking of the carbon nanomaterials in the application process; in particular, the diversity and controllability of the functionalized carbon nanotubes in the carbon nanotube-functionalized carbon nanotube hybrid material allow the structure and properties of the composite material to be adjusted in a wide range. By adding such a three-dimensional structure of carbon nanotubes to the resin matrix, the mechanical properties and the electrical and thermal conductivity of the resin matrix can be improved.

Compared with the prior art, the present invention has the following beneficial effects:

1. The present invention overcomes the problems that carbon nanotubes are very easy to agglomerate and difficult to disperse in solvents, and obtains a carbon nanotube aqueous dispersion with high stability (without stratification or precipitation in 6 months) and high concentration (up to 5 g/L).

2. The present invention utilizes the amphiphilicity of the functionalized carbon nanotubes, and drives the self-assembly of the carbon nanotubes and the functionalized carbon nanotubes into a stabilized Pickering system with controllable amphiphilicity by the π-π interaction and the oil-water interface free-energy reduction process, thereby constructing a multi-level, multi-scale composite based on the carbon nanohybrid reinforced polymer.

3. The dispersed carbon nanotubes of the functionalized carbon nanotubes prepared by the present invention well enhance the performance of the polymer composite, not only achieving the uniform dispersion of the carbon nanotubes in the polymer, but also retaining the structure and high length-diameter ratio of the carbon nanotubes, thus having high electrical and thermal conductivity.

4. The functionalized carbon nanotubes used in the present invention are commercial products with mature preparation process and controllable batches, so the present invention has high repeatability and reproducibility.

5. The preparation process of the present invention is carried out under ordinary pressure with few process steps, short preparation cycle, simple equipment, and excellent cost performance, thus having industrial production value.

DETAILED DESCRIPTION OF THE EMBODIMENTS

In order to better understand the present invention, the present invention will be further described below in combination with specific examples. However, these examples do not constitute a limitation on the protection scope of the claims of the present invention; based on these examples, other examples obtained by those skilled in the art without making creative efforts shall fall within the protection scope of the present invention.

In the examples of the present invention, a Malvern particle size analyzer (Malvern, ZS Nano S) was used to determine the Zeta potential of the carbon nanotube dispersion and analyze the dispersion stability of the carbon nanotubes.

In the examples of the present invention, a Malvern particle size analyzer (Malvern, ZS Nano S) was used to determine the hydrated particle size of the carbon nanotube dispersion and analyze the dispersion stability of the carbon nanotubes.

In the examples of the present invention, the method described in GB/T6753.3-1986 was used to determine the stability of the carbon nanotube dispersion by centrifugal sedimentation.

In the examples of the present invention, a scanning electron microscope (FE-SEM, SU-8200, Japan) was used to characterize the microscopic dispersion state of carbon nanotubes in the carbon nanotube dispersion.

In the examples of the present invention, E44 epoxy resin was used for compounding with the obtained carbon nanotube dispersion; a paint film was prepared according to the paint film scraping method described in GB/T1727-1992, and the compatibility between the carbon nanotube aqueous dispersion and the resin was determined by the observation of the characteristics of the paint film; the electrical conductivity was tested according to GB1410-78, the tensile property was determined according to GB/T1040-1992, and the thermal conductivity was tested according to ASTME153.

Example 1

Mixing, in parts by mass, 1 part of multi-walled carbon nanotubes (CNT-E3010, Zhongshan KANAITE Plastic Co., Ltd.), 0.5 part of carboxylated carbon nanotubes (containing a molar content of carboxyl of 1%, XF022, Nanjing XFNANO Materials Tech Co., Ltd.), and 120 parts of water uniformly, adjusting the pH to 8 with a sodium bicarbonate aqueous solution, and ultrasonically dispersing the resulting mixture for 1 h in a 100 W ultrasonic cleaner to obtain a stably dispersed carbon nanotube dispersion.

Figure 1:
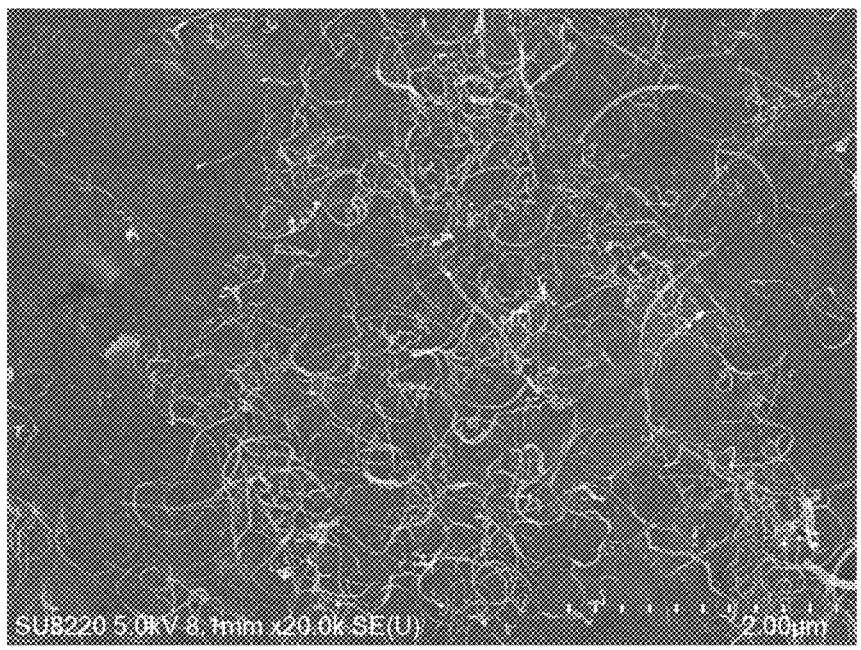
FIG. 1 shows a high-magnification SEM picture of the dispersion of the functional carbon nanotube-dispersed carbon nanotubes obtained in Example 1.

FIG. 1 shows a high-magnification SEM picture for characterizing the microscopic dispersion state of the dispersion of the functional carbon nanotube-dispersed carbon nanotubes (the stably dispersed carbon nanotube dispersion) obtained in Example 1 by using a scanning electron microscope (FE-SEM, SU-8200, Japan). It can be seen from the figure that carbon nanotubes could basically form a single-layer dispersion, but there were connecting junctions among the carbon nanotubes, and the dispersion state was better.

Figure 2:
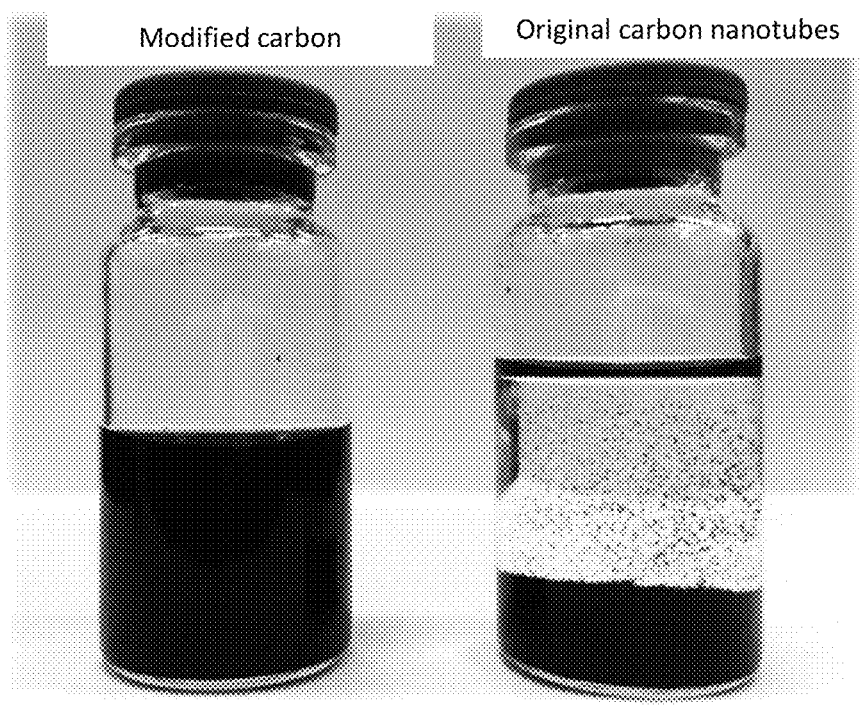
FIG. 2 shows a digital photo of the dispersion state of the functional carbon nanotube-dispersed carbon nanotubes obtained in Example 1 and the original carbon nanotubes.

FIG. 2 shows a digital photo, taken with a digital camera (Olympus E-M10 II), of the dispersion state of the functional carbon nanotube-dispersed carbon nanotubes obtained in Example 1 and the original carbon nanotubes after being allowed to stand for 3 weeks. It can be seen from the figure that the carbon nanotubes dispersed by the method of this example had high stability, and kept free of precipitation and stratification for a long time.

The apparent color of the obtained carbon nanotube dispersion was dark black, and the concentration of the same was 3 g/L. Upon measurement, the Zeta potential of the aqueous dispersion was −56.8 mV, and the hydrated particle size was 523.2 nm; no precipitation was found after a centrifuge was used to centrifuge at 5000 r/min for 15 min, which proved that the carbon nanotube aqueous dispersion had good stability. Generally speaking, when the absolute value of the Zeta potential is high and no precipitation is found in the centrifugal sedimentation experiment, it is proved that the dispersion stability can be kept for more than 3 months. Chinese invention patent application CN201410338909.8 discloses a method for preparing a high-concentration carbon nanotube dispersion liquid; by this method, carbon nanotubes can achieve the maximum concentration of 30 mg/mL with good dispersion performance, and will not settle for three months; however, this method uses strong acids, strong oxidants, and toxic and harmful amine compounds, which will cause secondary pollution emissions during the separation and purification process; in particular, excessive strong oxidation treatment of carbon nanotubes will lead to too many surface defects of carbon nanotubes, and make the excellent electrical conductivity thereof reduced or even lost. Since the method of this example used the original unmodified carbon nanotubes, it could ensure that the carbon nanotubes were well dispersed without reducing their electrical conductivity.

In the present invention, the E44 epoxy resin and the obtained carbon nanotube dispersion were directly added to the epoxy resin in a solution blending manner at a mass ratio of 100:1 and stirred uniformly, and a BGD 206/4 four-sided film scraper of the Biuged Laboratory Instruments Co. Ltd. was used to prepare a paint film with a thickness of 120 μm on a glass sheet. The paint film was a black high-gloss continuous paint film with the carbon nanotubes evenly dispersed in the resin without agglomeration, having good electrical conductivity (about $10^3 \Omega \cdot m$), high mechanical strength (elongation at break of 6.27%), and good thermal conductivity (thermal conductivity of 1.25 W/mK).

Figure 3:
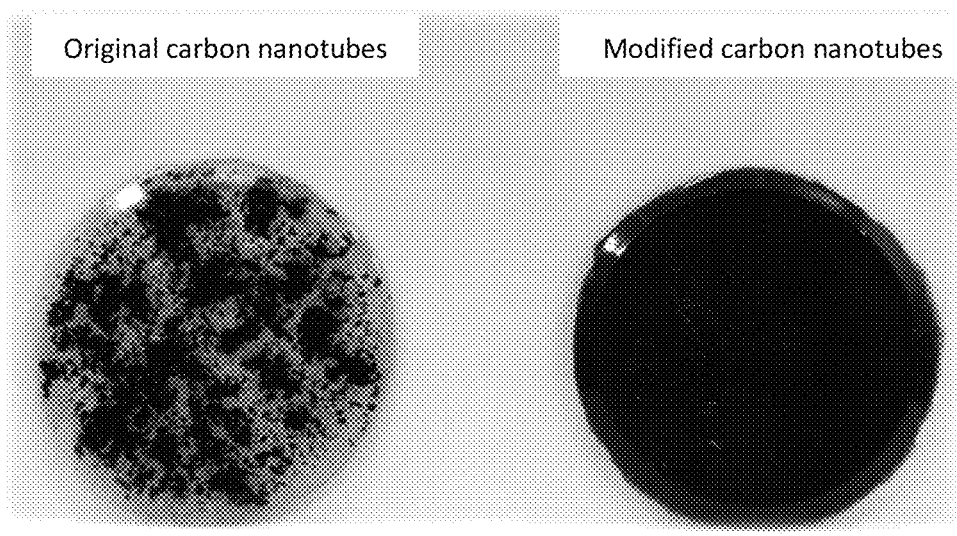
FIG. 3 shows a digital photo of the carbon nanotube/resin composites obtained in Example 1.

FIG. 3 shows a digital photo of the carbon nanotube resin obtained in Example 1, which was taken with a digital camera (Olympus E-M10 II). It can be seen from the figure that the modified carbon nanotubes had excellent dispersion performance, uniform color and no agglomeration in the epoxy resin.

The electrical conductivity of the carbon nanotube modified epoxy resin obtained by Chinese invention patent application CN201610570920.6 was $10^{-4}$ S/cm, while the carbon nanotube resin obtained by the method of this example had not only better thermal conductivity but also higher mechanical properties.

Example 2

Mixing, in parts by mass, 2 part of multi-walled carbon nanotubes (CNT-E3010, Zhongshan KANAITE Plastic Co., Ltd.), 2 part of hydroxylated carbon nanotubes (containing a molar content of hydroxyl of 1.5%, XF021, Nanjing XFNANO Materials Tech Co., Ltd.), and 800 parts of acetone uniformly, adjusting the pH to 8 with a sodium bicarbonate aqueous solution, and ultrasonically dispersing the resulting mixture for 1 h in a 100 W ultrasonic cleaner to obtain a stably dispersed carbon nanotube dispersion.

The apparent color of the obtained carbon nanotube dispersion was dark black, and the concentration of the same was 5 g/L. Upon measurement, the Zeta potential of the dispersion liquid was −60.8 mV, and the hydrated particle size was 583.2 nm; no precipitation was found after a centrifuge was used to centrifuge at 5000 r/min for 15 min, which proved that the carbon nanotube aqueous dispersion had good stability.

In the present invention, the E44 epoxy resin and the obtained carbon nanotube dispersion were directly added to the epoxy resin in a solution blending manner at a mass ratio of 100:1 and stirred uniformly, and a BGD 206/4 four-sided film scraper of the Biuged Laboratory Instruments Co. Ltd. was used to prepare a paint film with a thickness of 120 μm on a glass sheet. The paint film was a black high-gloss continuous paint film with the carbon nanotubes evenly dispersed in the resin without agglomeration, having good electrical conductivity (about $10^3 \Omega \cdot m$), high mechanical strength (elongation at break of 6.23%), and good thermal conductivity (thermal conductivity of 1.30 W/mK).

Example 3

Mixing, in parts by mass, 1 part of single-walled carbon nanotubes (CNT-E3010, Zhongshan KANAITE Plastic Co., Ltd.), 0.2 part of hydroxylated carbon nanotubes (containing a molar content of hydroxyl of 1.5%, XF021, Nanjing XFNANO Materials Tech Co., Ltd.), and 500 parts of ethanol uniformly, adjusting the pH to 9 with a sodium hydroxide aqueous solution, and ultrasonically dispersing the resulting mixture for 3 h in a 100 W ultrasonic cleaner to obtain a stably dispersed carbon nanotube dispersion.

The apparent color of the obtained carbon nanotube dispersion was dark black, and the concentration of the same was 0.24 g/L. Upon measurement, the Zeta potential of the dispersion liquid was −48.8 mV, and the hydrated particle size was 600.2 nm; no precipitation was found after a centrifuge was used to centrifuge at 5000 r/min for 15 min, which proved that the carbon nanotube aqueous dispersion had good stability.

In the present invention, the E44 epoxy resin and the obtained carbon nanotube dispersion were directly added to the epoxy resin in a solution blending manner at a mass ratio of 100:1 and stirred uniformly, and a BGD 206/4 four-sided film scraper of the Biuged Laboratory Instruments Co. Ltd. was used to prepare a paint film with a thickness of 120 μm on a glass sheet. The paint film was a black high-gloss continuous paint film with the carbon nanotubes evenly dispersed in the resin without agglomeration, having good electrical conductivity (about $10^3 \Omega \cdot m$), high mechanical strength (elongation at break of 6.19%), and good thermal conductivity (thermal conductivity of 1.35 W/mK).

Example 4

Mixing, in parts by mass, 1 part of single-walled carbon nanotubes (CNT-E3010, Zhongshan KANAITE Plastic Co., Ltd.), 0.5 part of hydroxylated carbon nanotubes (containing a molar content of hydroxyl of 1.2%, XF021, Nanjing XFNANO Materials Tech Co., Ltd.), and 1000 parts of N-methylpyrrolidone uniformly, adjusting the pH to 9 with a sodium hydroxide aqueous solution, and ultrasonically dispersing the resulting mixture for 0.5 h in a 100 W ultrasonic cleaner to obtain a stably dispersed carbon nanotube dispersion.

The apparent color of the obtained carbon nanotube dispersion was dark black, and the concentration of the same was 0.0011 g/L. Upon measurement, the Zeta potential of the dispersion liquid was −43.8 mV, and the hydrated particle size was 610.2 nm; no precipitation was found after a centrifuge was used to centrifuge at 5000 r/min for 15 min, which proved that the carbon nanotube aqueous dispersion had good stability.

In the present invention, the E44 epoxy resin and the obtained carbon nanotube dispersion were directly added to the epoxy resin in a solution blending manner at a mass ratio of 100:1 and stirred uniformly, and a BGD 206/4 four-sided film scraper of the Biuged Laboratory Instruments Co. Ltd. was used to prepare a paint film with a thickness of 120 μm on a glass sheet. The paint film was a black high-gloss continuous paint film with the carbon nanotubes evenly dispersed in the resin without agglomeration, having good electrical conductivity (about $10^2 \Omega \cdot m$), high mechanical strength (elongation at break of 6.10%), and good thermal conductivity (thermal conductivity of 1.38 W/mK).

It should be noted that the embodiments of the present invention are not limited by the above examples; without departing from the spirit and scope of the present invention, the present invention may have various changes and improvements, all of which shall fall within the claimed protection scope of the present invention defined by the claims.

The invention claimed is:

1. A method for efficiently dispersing carbon nanotubes, characterized in that: the method comprises mixing, in parts by mass, 1-30 parts of original carbon nanotubes without side wall functionalization or end group functionalization, 0.2-10 parts of functionalized carbon nanotubes and 400-1200 parts of a solvent, adjusting a pH of a resulting mixture to 5-9, and then ultrasonically dispersing the mixture to obtain a stably dispersed carbon nanotube dispersion;

the functionalized carbon nanotube is one or more of a carboxylated carbon nanotube, a hydroxylated carbon nanotube, an aminated carbon nanotube, an acyl-chlorinated carbon nanotube, and a sulfonated carbon nanotube.

2. The method for efficiently dispersing carbon nanotubes according to claim 1, characterized in that: the original carbon nanotube is one of a single-walled carbon nanotube, a double-walled carbon nanotube, a multi-walled carbon nanotube, a nitrogen-doped carbon nanotube, and a fluorine-doped carbon nanotube.

3. The method for efficiently dispersing carbon nanotubes according to claim 1, characterized in that: the original carbon nanotube is 0.5-2 μm in length and 30-50 nm in diameter.

4. The method for efficiently dispersing carbon nanotubes according to claim 1, characterized in that: the solvent is one of water, acetone, ethanol, butyl acetate, toluene, N-methyl-2-pyrrolidone, N,N-dimethylformamide, and dimethyl sulfoxide.

5. The method for efficiently dispersing carbon nanotubes according to claim 1, characterized in that: the reagent for adjusting pH is one of sulfuric acid, phosphoric acid, nitric acid, acetic acid, phosphoric acid, ammonia water, sodium hydroxide, sodium hydroxide, and sodium bicarbonate.

6. The method for efficiently dispersing carbon nanotubes according to claim 1, characterized in that: the ultrasonic power is 70-120 W.

7. The method for efficiently dispersing carbon nanotubes according to claim 1, characterized in that: the ultrasonic dispersion time is 0.15-3 h.

* * * * *